United States Patent [19]  
Milberger et al.

[11] 3,883,573  
[45] May 13, 1975

[54] COMMERCIAL FIXED-BED ACRYLONITRILE OR METHACRYLONITRILE

[75] Inventors: Ernest C. Milberger, Solon; Serge R. Dolhyj, Parma; James F. White, Akron, all of Ohio

[73] Assignee: Standard Oil Company, Cleveland, Ohio

[22] Filed: June 15, 1973

[21] Appl. No.: 370,287

[52] U.S. Cl. ............................................. 260/465.3
[51] Int. Cl. ..................................... C07c 121/02
[58] Field of Search ............................. 260/465.3

[56] References Cited
UNITED STATES PATENTS

| | | | |
|---|---|---|---|
| 3,009,943 | 11/1961 | Hadley et al. | 260/465.3 |
| 3,230,246 | 1/1966 | Callahan et al. | 260/465.3 |
| 3,370,083 | 2/1968 | Ferlazzo et al. | 260/465.3 |
| 3,427,343 | 2/1969 | Callahan et al. | 260/465.3 |
| 3,478,082 | 11/1969 | Huibers | 260/465.3 |
| 3,479,385 | 11/1969 | Huibers | 260/465 |
| 3,518,284 | 6/1970 | Foster | 260/465.3 X |
| 3,541,129 | 11/1970 | Yamada et al. | 260/465.3 |
| 3,625,867 | 12/1971 | Yoshino et al. | 260/465.3 X |
| 3,678,091 | 7/1972 | Reulet et al. | 260/465.3 |
| 3,681,421 | 8/1972 | Barclay et al. | 260/465.3 |

*Primary Examiner*—Joseph P. Brust
*Attorney, Agent, or Firm*—Herbert D. Knudsen

[57] ABSTRACT

Very desirable temperature control in the ammoxidation of propylene or isobutylene in a fixed-bed, tubular reactor is obtained by using an oxidation catalyst having two physical forms. The first catalyst which initially contacts the reactants is an essentially inert support having a strongly adhering coat of a catalytic material, and the second catalyst that contacts the reactants after contact with the first catalyst consists essentially of the catalytic material.

4 Claims, 2 Drawing Figures

COMMERCIAL FIXED-BED ACRYLONITRILE OR METHACRYLONITRILE

BACKGROUND OF THE INVENTION

There are a large number of catalysts known to be effective in the ammoxidation of propylene or isobutylene. The present invention is not a new catalyst but a method of adapting the known catalysts to an improved process for preparing unsaturated nitriles.

In a fixed-bed ammoxidation reaction, very significant problems of heat generation are encountered because of the exothermic nature of the reaction. To allow for the dissipation of the heat generated, low rates of throughput and small diameter tubing have been employed. The present invention is directed toward the solution of this problem by a more economically acceptable technique.

SUMMARY OF THE INVENTION

It has now been discovered in the process for preparing acrylonitrile or methacrylonitrile by the reaction of a mixture of propylene or isobutylene, ammonia and molecular oxygen in the presence of an oxidation catalyst in a fixed-bed reactor containing one or more tubes, the improvement comprising using two catalysts in the tubes of the fixed-bed reactor—the first catalyst being a catalyst comprising an essentially inert support material with an outer surface and a coating of a catalytic material strongly adhering to the outer surface of the support and the second catalyst being a catalyst consisting essentially of the catalytic material and arranging the catalysts in the tubes of the fixed-bed reactor in such a manner that the first catalyst contacts the reactants first and the second catalyst contacts the reactants subsequent to contact with the first catalyst. The present invention makes temperature control of the exothermic reaction very convenient, while at the same time high conversions of the olefins are maintained.

The basic thrust of the invention is the use of two catalysts having different physical forms. The first catalyst is a coated catalyst, and the second catalyst consists essentially of the catalytic material.

The term "inert support" means a support material that when placed in the reactor by itself and run under the reaction conditions of the ammoxidation, gives less than about 10% per pass conversion to the desired nitrile. The term "catalytic material" means the active catalytic ingredients optionally containing a support material, such as silica, dispersed throughout the active ingredients.

As noted above, the present invention is not new active catalytic ingredients, but rather it is a method of adapting catalysts known in the art to a suitable fixed-bed process. This process of the invention uses a coated catalyst as the first catalyst and a catalyst consisting essentially of the catalytic material as the second catalyst.

The first catalyst is a coated catalyst consisting of an essentially inert support having an outer coating of catalytic material. The inert support may be any material that is not active in the ammoxidation reaction. Suitable examples of essentially inert support materials include: silica, alumina, Alundum, silicon carbide, boron phosphate, zirconia and the like. The inert support must be at least partially porous.

The essentially inert support may be about 0.1 cm. or larger. While there is no theoretical upper limit on the size, the inert support is generally less than 2 cm. in diameter.

The catalytic material may be coated onto inert support by partially wetting the support with water or other liquid and contacting the partially wet support material with a powder of the active catalytic material, preferably in a rolling motion. Using this technique, the catalytic material forms a strongly adhering coat on the support material. In the preferred preparation of the first catalyst spherical supports are used to obtain preferred spherical first catalysts.

The relative amounts of the inert support and catalytic material may vary widely. The coating of catalytic material may be relatively thin or rather thick. In a preferred practice of the invention, the first catalyst contains about 5 to about 60% by weight of the catalytic material.

The second catalyst consists essentially of the catalytic material. These catalysts as noted may contain a support material dispersed throughout the catalyst. These catalysts are normally the catalysts that have been employed alone in ammoxidation reactions. Various forms of this second catalyst such as tablets, spheres and pellets are known.

The term "consisting essentially of" in the context of this invention relates to the catalyst particle. Thus, for example, particles of catalytic material physically mixed with particles of a solid diluent would meet this criterion.

In a preferred practice of the invention, the catalytic material employed in the first catalyst and the catalyst material employed in the second catalyst are essentially the same. Possible interference of one active ingredient with another is thus eliminated.

The relative amounts of the first catalyst and second catalyst may vary widely. Enough of the first catalyst should be employed to control the temperature of the reaction. Enough of the second catalyst should be employed so assure that the conversion of the olefin is at a desirably high (above 90%) level. In a preferred practice of the invention, about 10 to about 80% by volume of the reactor tube contains the first catalyst.

As noted above, the active catalytic ingredients may be selected from any of the ingredients in the art. In a preferred practice of the invention, the active ingredients of the catalytic material are described by the formula

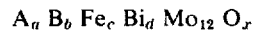

$$A_a\ B_b\ Fe_c\ Bi_d\ Mo_{12}\ O_x$$

wherein

A is an alkali metal, alkaline earth metal, Sm, Ta, Tl, In, Ga, B, P, As, Sb or mixtures thereof;

B is nickel, cobalt, magnesium, manganese or mixture thereof;

$a$ is a number of 0 to about 8;

$b$ is a number of 0 to about 20;

$c$ is a number from about 0.1 to about 10;

$d$ is a number from about 0.01 to about 6; and $x$ is the number of oxygens required to satisfy the valence requirements of the other elements present.

Of these catalysts, the preferred catalysts contain nickel, cobalt, magnesium, manganese or mixture thereof. This is accomplished in the formula by setting $b$ equal to a positive number. Also, catalysts containing nickel, cobalt or mixtures thereof are especially preferred, i.e., where B is cobalt, nickel or mixture thereof.

Those catalysts containing potassium are also preferred.

The reaction of the present invention is run according to the parameters described in the art. The reactants, catalysts, reaction conditions and the like are those within the ranges that are known. The molar ratio of ammonia to olefin may range from about 0.5 to about 5 and the ratio of molecular oxygen to olefin is about 0.7 to about 4 or more. The reaction can be run at atmospheric, subatmospheric or superatmospheric pressure. The temperatures range from about 200° to about 600°C., with temperatures of 300° to about 500°C. being preferred. The contact time may range up to about 20 seconds or more.

The important aspect of the invention is the very desirable temperature control permitted at high olefin conversions. These desirable benefits are obtained using the two catalyst systems of the invention.

DESCRIPTION OF THE DRAWING

Referring to FIG. 1, it is seen that the reactor consists of an outer shell 1 containing a plurality of tubes 2. Each of the tubes contains a first catalyst 3 and a second catalyst 4 in such a manner that the reactants contact the first catalyst first.

Figure 1:
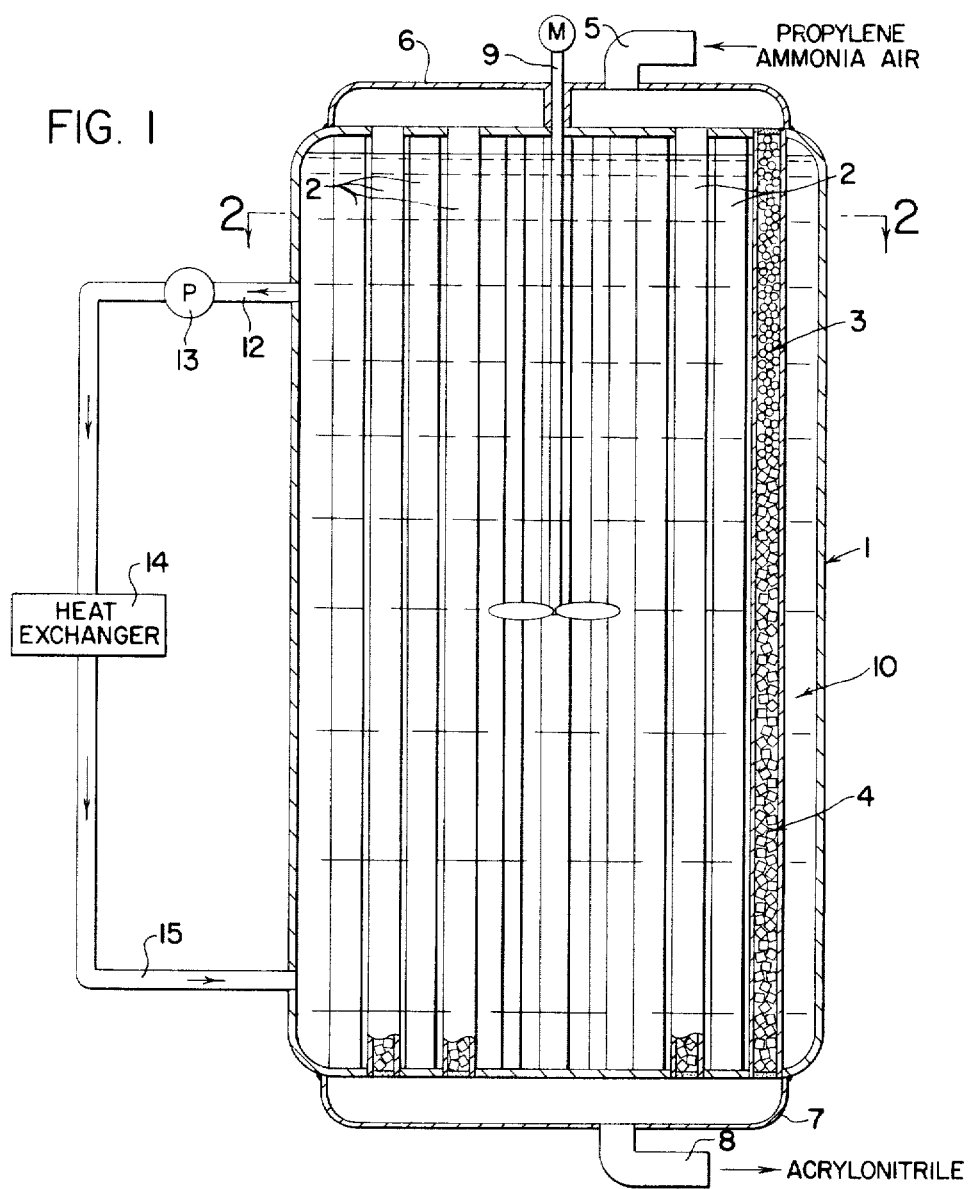
FIG. 1 shows a side-view of a fixed-bed acrylonitrile reactor.
Figure 2:
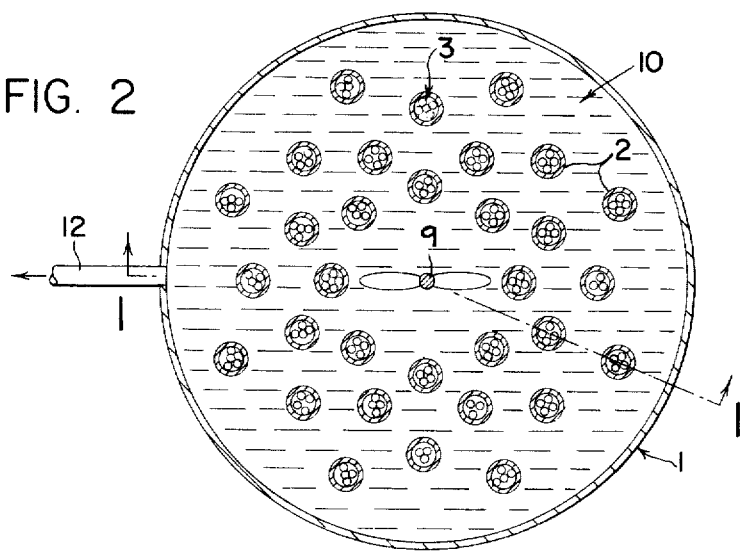
FIG. 2 shows a top-view of the acrylonitrile reactor.

The reactants are fed through conduit 5 into manifold 6 where the reactants are distributed evenly to the tubes 2. The products are collected in manifold 7 and passed to recovery and purification operations (not shown) by conduit 8.

The reactor is equipped with a stirrer 9 that stirs heat transfer fluid 10. Heat transfer fluid 10 is cooled by a heat exchange system 12, 13, 14 and 15 and returned to the reactor shell.

SPECIFIC EMBODIMENTS

Example 1 — One-Third Coated — Two-Thirds Pelleted Catalyst.

A fixed-bed reactor was constructed using 2.24 cm. inside diameter stainless steel tube, having a reaction zone 2.9 meters long. A catalyst having the composition 87.5% $K_{0.07}Ni_{2.5}Co_{4.5}Fe_3BiP_{0.5}Mo_{12}O_x$ and 17.5% $SiO_x$ was prepared according to Ser. No. 157,659 filed June 28, 1971. The catalyst was denitrified at 427°C. A portion of this catalyst was coated on 0.32 cm. diameter Alundum spheres by partially wetting the Alundum spheres with water, contacting the spheres with a powder of the catalytic material in a rolling motion and drying the coated supports. The coated catalyst contained 33.3% by weight of the catalytic material. The coated catalyst was calcined for two hours at 538°C. The other portion of the catalyst was made into 0.5 cm. diameter pellets.

The first third of the reaction zone was filled with the coated catalyst and the remaining two-thirds of the reaction zone was filled with the pelleted catalyst. The temperature of the bath surrounding the reaction zone was maintained at 410°C. A feed of propylene/ammonia/air/steam in the molar ratio of 1/1.1/10.1/4.0 was passed over the catalyst at a pressure of 3.8 p.s.i.g. and a contact time of 3.8 seconds. The percent per pass conversion defined as the moles of acrylonitrile found in the reactor effluent multiplied by 100 divided by the moles of propylene fed was 81.2%, and the propylene was 97% converted to products. The highest temperature recorded in the reactor was 480°C.

Comparative Examples A and B — Pelleted Catalyst Alone.

For purposes of comparison, a parallel reaction was conducted under substantially the same reaction conditions using the same reactant feed using 100% of the pelleted catalyst. An uncontrollable exothermic reaction occurred.

For a further comparison, the temperature of the bath using 100% pelleted catalyst was lowered to 388°C. using a feed of propylene/ammonia/air/steam of 1/1.1/10.1/3, a pressure of 3.6 p.s.i.g. and a contact time of 3.9 seconds. The per pass conversion to acrylonitrile was 74.9% with a propylene conversion of 91.9%. The present invention giving an 81.2% per pass conversion at 97% propylene conversion is a significant improvement over this art technique.

Example 2 — One-Half Coated — One-Half Pelleted Catalyst.

In the same manner as shown for Example 1, the first half of the catalytic reactor tube was filled with the coated catalyst, and the second half of the reactor tube was filled with the pelleted catalyst.

At a bath temperature of 400°C. a reactant feed of propylene/ammonia/air/steam of 1/1.1/9.6/1.5 was fed over the catalyst at a pressure of 5 p.s.i.g. and a contact time of 4 seconds. The per pass conversion to acrylonitrile was 80.5% at a 97.9% propylene conversion. Outstanding temperature control was maintained throughout the reactor with the highest temperature recorded throughout the reactor being 430°C.

In the same manner as shown by the example above, isobutylene is substituted for the propylene in the feed and methacrylonitrile is produced. Also, in the same manner as shown above for one particular catalyst, other catalysts that are known to be useful for the ammoxidation of olefins are employed in coated form in combination with the essentially pure catalytic material to produce desirable fixed-bed ammoxidation reactions.

We claim:

1. In the process for preparing acrylonitrile or methacrylonitrile by the reaction of a mixture of propylene or isobutylene, ammonia and molecular oxygen in the presence of an ammoxidation catalyst in a fixed-bed reactor containing one or more tubes, the improvement comprising using two catalysts in each of one or more of the tubes of the fixed-bed reactor—the first catalyst being a catalyst consisting of an essentially inert support material with an outer surface and coating of a catalytic material strongly adhering to the outer surface of the support, and the second catalyst being a catalyst consisting essentially of the catalytic material and arranging the catalysts in the tube of the fixed-bed reactor in such a manner that the first catalyst contacts the reactants first and the second catalyst contacts the reactants subsequent to contact with the first catalyst.

2. The process of claim 1 wherein the catalytic material of the first catalyst and the catalytic material of the second catalyst are substantially the same.

3. The process of claim 1 wherein the first catalyst contains about 5 to about 60% catalytic material.

4. The process of claim 1 wherein the reactor tubes contain about 10 to about 80% by volume of the first catalyst.

* * * * *